United States Patent
DeMorrow et al.

(10) Patent No.: US 9,009,256 B1
(45) Date of Patent: Apr. 14, 2015

(54) EXTRACTION AND CLASSIFICATION OF USER GENERATED CONTENT

(75) Inventors: Jason E. DeMorrow, Bellevue, WA (US); Donald L. Kaufman, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 658 days.

(21) Appl. No.: 13/340,017

(22) Filed: Dec. 29, 2011

(51) Int. Cl.
*G06F 15/16* (2006.01)
*H04L 29/08* (2006.01)
*G06F 17/30* (2006.01)

(52) U.S. Cl.
CPC .......... *H04L 67/02* (2013.01); *G06F 17/30705* (2013.01); *G06F 17/30551* (2013.01); *G06F 17/30707* (2013.01)

(58) Field of Classification Search
CPC .............. H04L 67/02; G06F 17/30705; G06F 17/30551; G06F 17/30707
See application file for complete search history.

(56) References Cited

U.S. PATENT DOCUMENTS

| | | | |
|---|---|---|---|
| 2007/0223699 A1* | 9/2007 | Jones et al. | 380/262 |
| 2007/0294199 A1* | 12/2007 | Nelken et al. | 706/50 |
| 2010/0185569 A1* | 7/2010 | Hu et al. | 706/12 |
| 2011/0191270 A1* | 8/2011 | Peng et al. | 706/10 |

* cited by examiner

*Primary Examiner* — Hee Soo Kim
(74) *Attorney, Agent, or Firm* — Thomas | Horstemeyer, LLP.

(57) ABSTRACT

Disclosed are various embodiments for a content handler that automatically detects actionable user generated content. The content handler retrieves a text block from a network site and processes the text block for generating a score, wherein the score is a value between a predefined range of values. The content handler may also determine that a content of the text block expresses an actionable user concern when the score exceeds a threshold value, wherein the actionable user concern is capable of being addressed by a customer service agent. Moreover, the content handler may store, in a memory accessible to a representation of the text block in a queue when the text block has the content that expresses the actionable user concern and grant access to the queue for generating a message for a user associated with the text block.

22 Claims, 5 Drawing Sheets

EXTRACTION AND CLASSIFICATION OF USER GENERATED CONTENT

BACKGROUND

The internet allows network sites to host large bodies of content generated by many users. This body of content is continuously growing. Users may discuss a variety of topics as they contribute to the body of content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing a way for customer service agents to address customer concerns that are expressed in social media sites, blogs, or any other network site that includes user generated content. It may be the case that a user complains about the operation of an online merchant by posting text on a network site. A user may be an actual customer, a potential customer, a product critic or any other individual. In some instances, customer complaints are not actionable. That is to say, a customer service agent of the merchant is unable to address a customer concern. For example, a customer service agent might find it too difficult to address a customer concern regarding a general unhappiness towards the operation of the online merchant. However, some customer posts express customer concerns that are actionable or otherwise addressable by a customer service agent. For example, a customer who complains about a specific, recent issue regarding the operation of the online merchant may be something that a customer service agent can readily address. Various embodiments of the present disclosure discuss retrieving user generated content from one or more network sites. Moreover, retrieved user generated content may be classified according to whether the user generated content is actionable or not actionable. Actionable items are presented to a customer service agent for addressing the concern of a customer. In the following discussion, a general description of the system and its components is provided, followed by a discussion of the operation of the same.

Figure 1:
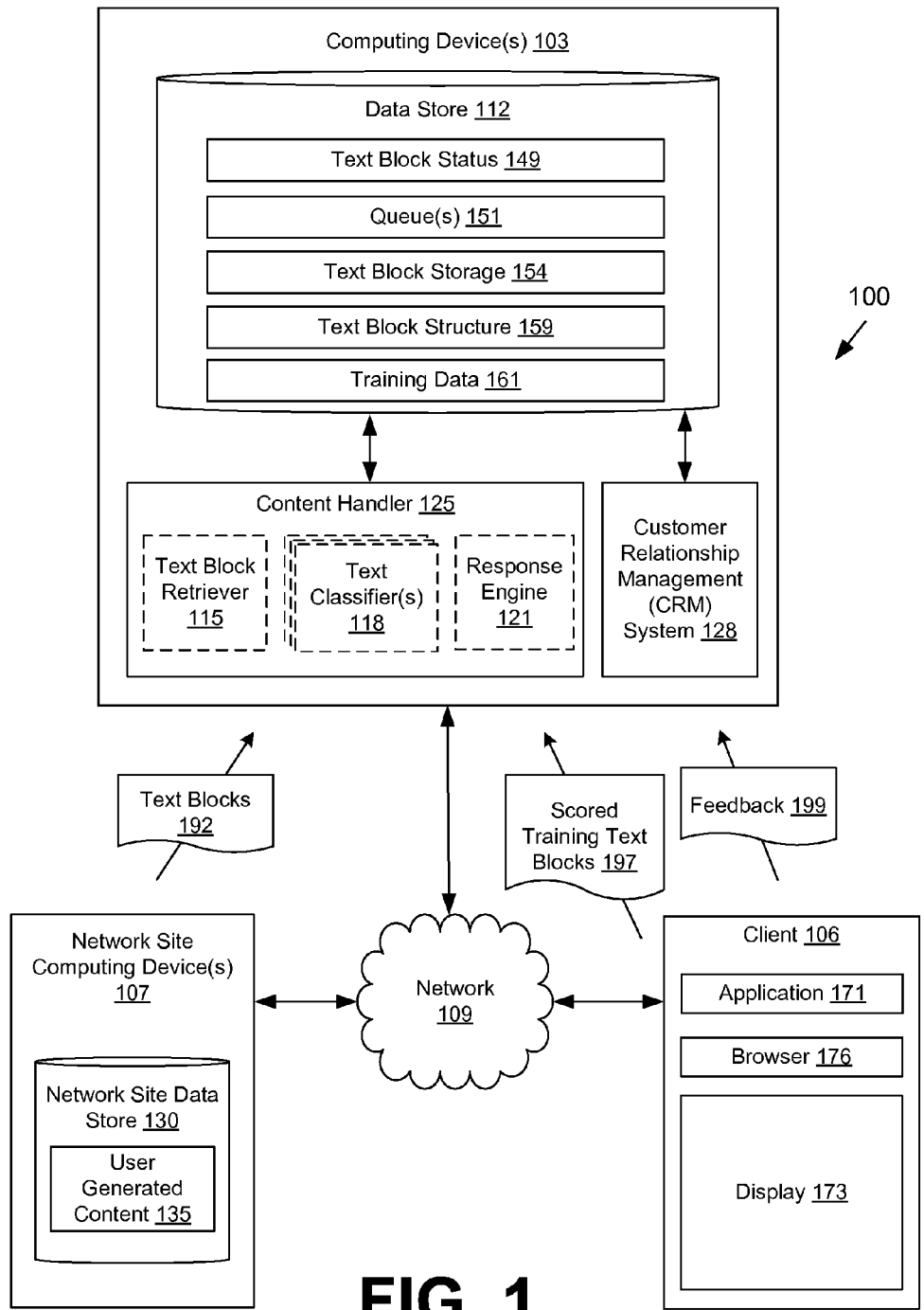
FIG. 1 is a drawing of a networked environment according to various embodiments of the present disclosure.

With reference to FIG. 1, shown is a networked environment 100 according to various embodiments. The networked environment 100 includes one or more computing devices 103 in communication with one or more clients 106 by way of a network 109. Additionally, one or more network site computing devices 107 are also in data communication with one or more computing device 103 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a content handler 125, the customer relationship management (CRM) system 128, and other applications, services, processes, systems, engines, or functionality not discussed in detail herein. The content handler 125 is executed to identify and retrieve content from one or more network sites, classify the extracted content and facilitate a response to customer issues expressed in the content. Specifically, the content handler 125 is configured to identify any blocks of text that have been authored or posted by a particular customer, such as a customer. Customers may express any customer concern as user generated content in a network site. A network site, for example may be a social media site, microblog, blog, user review, online forum, or any site that includes user generated content.

The content handler 125 includes a text block retriever 115 for retrieving text blocks 192 from network sites. Text blocks 192 may be a set of text authored by a particular customer who posts on the network site. Also, the content handler 125 includes a text classifier 118 for determining whether retrieved text blocks 192 are actionable or unactionable. For example, the text classifier 118 determines whether the content of a text block 192 expresses an actionable customer concern or issue such that the concern or issue may be addressed by customer service agents. The content handler 125 may include one or more text classifiers 118. The content handler 125 further includes a response engine 121 for managing any text block 192 that has been flagged as "actionable."

The CRM system 128 provides a platform for allowing customer agents to manage customer issues. For example, customer service agents may be grouped by customer issue, such that a group of customer service agents are responsible for a particular customer issue. The CRM system 128 allows a group of customer service agents to gain access to customer issue data for taking remedial action to resolve a particular customer issue.

The data stored in the data store 112 includes, for example, a text block status 149, one or more queues 151, a text block storage 154, a text block structure 159, training data 161, and potentially other data. The text block status 149 includes any information regarding a retrieved text block 192 such as the time of retrieval, an identification of the text block 192, a link to the network page of the network site of where the text block 192 originated, a user identifier associated with the text block 192, or any other information relating to the extraction or retrieval of the text block 192.

The queue 151 records text blocks 192 that have been flagged as "actionable." In one embodiment, the queue 151 is managed by the CRM system 128 for granting customer service agents access to text blocks 192 stored in the queue 151. Furthermore, the CRM system 128 may serialize the items in the queue 151 for creating a contact list for customer service agents. The text block storage 154 stores text blocks 192. For example, the raw text of text blocks may be stored in text block storage 154. Alternatively, encrypted or encoded text blocks 192 may be stored in the text block storage 154. In one embodiment, the text block storage 154 is a temporary storage that provides a buffer functionality for storing recently retrieved text blocks 192. That is to say, text blocks 192 are temporarily stored prior to processing and classification of the text block 192.

The text block structure 159 stores information about how retrieved text blocks 192 relate to one another. In one embodiment, the text block structure 159 facilitates organizing retrieved text blocks 192 in a tree structure. Data store 112 further includes training data 161. Training data 161 reflects information generated from use of the text classifier 118. For example, the knowledge base that a text classifier 118 builds over the course of use may be encoded as training data 161. For example, scored training text blocks 197 and feedback 199 may be used to build the knowledge base to facilitate training the text classifier 118. Scored training text blocks 197 may be sample text blocks with a corresponding predetermined score. For example, scored training text blocks 197 may be a plurality of text blocks that have been deemed actionable by a customer service agent. Feedback 199 may be information used to correct a previously classified text block 192. For example, if the text classifier 118 inaccurately classifies a text block 192 as actionable, a customer service agent may submit feedback 199 to reclassify the particular text block 192 to reduce the risk of repeating a similar misclassification.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 176, dedicated applications 171 and/or other applications. The browser 176 may be executed in a client 106, for example, to access and render network pages, such as web pages, or other network content served up by the computing device 103 and/or other servers. Rendered network pages may be presented in a display 173. The client 106 may be configured to execute applications beyond browser 176 and dedicated application 171, such as, for example, email applications, instant message applications, and/or other applications.

Clients 106 may be used by customers accessing network sites for posting user generated content. Clients 106 may also be used by customer service agents for contacting users, such as customers. Customer service agents may use one or more clients 106 to send scored training text blocks 197 and/or feedback 199 for training the text classifier 118.

The network site computing device 107 may comprise, for example, a server computer or any other system providing computing capability. Alternatively, a plurality of network site computing devices 107 may be employed that are arranged, for example, in one or more server banks or computer banks or other arrangements. For example, a plurality of network site computing devices 107 together may comprise a cloud computing resource, a grid computing resource, and/or any other distributed computing arrangement. Such network site computing devices 107 may be located in a single installation or may be distributed among many different geographical locations. For purposes of convenience, the network site computing device 107 is referred to herein in the singular. Even though the computing device is referred to in the singular, it is understood that a plurality of network site computing devices 107 may be employed in the various arrangements as described above.

Network site computing devices 107 operate a plurality of network sites for facilitating the presentation of user generated content. For example, each network site may be operated by one or more network site computing devices 107. A network site data store 130 is included in the network site computing device 107. The network site data store 130 includes user generated content 135 and potentially other data.

Next, a general description of the operation of the various components of the networked environment 100 is provided. To begin, a customer using a client 106 may author content and post it to a network site served up by a network site computing device 107. For example, a customer may post user reviews, customer comments, blog entries or any other user generated content to a network site. Additionally, a customer may send public or private messages for posting on a social media network site. As customers continue generating content, the text contained in a network site is updated with new user generated content. Network site computing devices 107 operate network sites as customers continue to post user generated content 135 to various network sites. User generated content, for example, may be opinions, criticism, or an explanation of issues that a customer has regarding the operations of an online merchant. Customers may complain about merchants by posting their experiences with a particular merchant in a blog, social media message, or any other network site A content handler 125 executed in a computing device 103 employs a text block retriever 115 for retrieving text blocks 192 from the various network sites. Text blocks 192 may be individual blog posts, comments, individually addressed messages, private messages, forum messages, microblog posts, or any other textual message authored by a user, such as a customer or a critic. In one embodiment, multiple text blocks 192 may exist on a single network page. Alternatively, the text of an entire network page associated with a particular network site may be handled as a text block 192.

A content handler 125 employs a text block retriever 115 that is configured to access various network sites for extracting and retrieving text blocks 192. In one embodiment, the text block retriever 115 implements a variety of Application Programming Interface (API) function calls to retrieve text blocks 192. A set of API functions may vary according to network site. In this case, the text block retriever 115 is configured to employ a different set of API functions for each network site.

In another embodiment, the text block retriever 115 crawls or otherwise searches content and information of a public network site for identifying and retrieving text blocks 192. For example, a text block retriever 115 accesses a forum or a blog network site and identifies text blocks 192 for retrieval.

Further, in another embodiment, the text block retriever 115 is configured to access a portion of a social network site to which it has authorized access. For example, an online retailer who operates the text block retriever 115 may own a social network page as part of a social network site. Hence, the text block retriever 115 is configured to access and crawl the owned social network page.

Once a text block retriever 115 retrieves a text block 192, the text block retriever 115 may store the retrieved text block 192 in the text block storage 154. In one embodiment, the text block storage 154 is a memory buffer that temporarily stores a text block 192 until it is classified at some later point in time. In another embodiment, the text block storage 154 is a long term storage that stores all retrieved text blocks 192 over a period of time. The text block storage 154 may store a hash value or any other representation of a retrieved text block 192 rather than storing the raw text block 192 itself. In this example, storing a representation of the text block 192 optimizes text block storage space.

In addition to storing a text block 192 in a text block storage 154, the text block retriever 115 is configured to store a text block status 149 associated with each text block 192. The text block status 149 may assist the text block retriever 115 in determining when a text block 192 was last retrieved. Furthermore, the text block status 149 may include user identification information for matching a particular text block 192 to its respective authoring customer.

Upon retrieval of a text block 192, the text block retriever 115 may also be configured to store a text block structure 159 corresponding to each retrieved text block 192. A text block structure 159 indicates the relationship between text blocks 192 of a particular network site. In one embodiment, the text block structure 159 reflects a tree or star relationship between the various text blocks of a particular network site. The information represented by the text block structure 159 assists the text block retriever 115 in determining when a particular text block 192 included in a network site has been retrieved. Furthermore, storing the text block structure 159 assists the text block retriever 115 by determining which text blocks 192 have been retrieved in the past.

Using the combination of the text block structure 159 and the text block status 149 ensures that all text blocks 192 from a particular network site have been retrieved at least once. Moreover, the text block retriever 115 is configured to manage the frequency it accesses a particular text block 192 based on the text block status 149 and text block structure 159. This protects against excessive retrieval of the same text block 192 which may burden the resources of the text block retriever 115. Thus, the text block retriever 115 can effectively curate and manage data posted in a particular network site as one or more customers may continuously update user content.

One or more text classifiers 118 are responsible for categorizing a particular text block 192 into one of two buckets. Specifically, a text classifier 118 determines whether the text block 192 is "actionable" or "unactionable." Text blocks 192 may be treated as units of user content. For example, a customer comment within a blog post, comment section, forum message, or any other free text field that facilitates the generation of customer commentary may be captured as a text block 192. Furthermore, a text block 192 associated with a particular customer includes content that reflects opinions or thoughts of the customer. Accordingly, the content of a text block 192 may express a customer concern that is "actionable." In various embodiments where multiple text classifiers 118 are employed, each text classifier 118 is individually configured, where each individual configuration embodies a unique definition of what constitutes an "actionable" customer concern.

For example, an actionable customer concern may be any issue deemed important to a customer service agent. A user may be a customer who expresses a customer concern within a text block 192 and a customer service agent may desire to respond to the concern. The desire to respond to the customer deems a particular text block 192 as actionable. Accordingly, there may be various definitions of what constitutes an "actionable" customer concern where each definition is defined by one or more customer service agents. Customer service agents define "actionable" by training a text classifier 118, which is discussed in greater detail below.

The text classifier 118 receives a text block input and in response, generates a score that correlates to the degree that a text block is actionable. In one embodiment, the text classifier 118 generates a score that is within a predefined range. Accordingly, scores closer to one extreme are deemed actionable while scores at the opposite extreme are deemed unactionable. For example, a score may be any value within a range of 0 to 1. Scores that are closer to 1 are deemed actionable. Furthermore, a threshold value may be assigned to the classifier for categorizing a text block input into a binary result. That is to say, a binary result is derived from the score based on whether a score is above or below a threshold value. Hence, the threshold value is set to some value in between the predefined range. In one embodiment, scores may be close to the threshold value, which indicates that classification of a text block 192 may be difficult. In this case, text blocks 192 that are assigned scores that are close to a threshold value are flagged and presented to a customer service agent for review. Moreover, a customer service agent may manually select a score to reclassify the text block 192. This effectively provides feedback 199 to the text classifier 118 to build the knowledge base of the text classifier.

In one embodiment, text classifiers 118 are trained by an administrator such as a customer service agent for configuring the text classifier 118 to be more likely to produce accurate results. In one embodiment, feedback 199 may be fed into a text classifier 118 where each feedback 199 may correct or confirm a previously classified text block 192. In another embodiment, scored training text blocks 197 are used to train the text classifier 118. For example, a customer service agent may input a text block 192 into a text classifier 118 and then instruct the text classifier 118 that the text block input is either expected to be "actionable" or "unactionable." Over the time of training, a text classifier 118 builds its knowledge base and stores the knowledge base as training data 161. The text classifier 118 learns what text blocks 192 are "actionable" or "unactionable" and processes subsequent text blocks 192 accordingly.

In various embodiments, multiple text classifiers 118 are employed such that each text classifier is trained according to a particular customer issue. For example, in a set of employed text classifiers 118, a first text classifier 118 may be trained to determine whether a particular text block 192 expresses an actionable product shipment issue and a second text classifier 118 may be trained to determine whether a particular text block 192 expresses an actionable product return issue.

A response engine 121 is used for bridging the gap between a customer service agent and a customer who generated user content on a network page, where the user content expresses an actionable customer concern. Specifically, after a text classifier 118 classifies a particular text block 192 as "actionable" the response engine 121 updates a queue 151 for managing text blocks 192 that are classified as actionable. In one embodiment, the queue 151 includes a plurality of line items where each line item refers to a different text block that has been classified as actionable.

In various embodiments, the response engine 121 provides an interface between the content handler 125 and the CRM system 128. In this case, classified text blocks that are outputted from the text classifier 118 are fed into the CRM system 128 for allowing customer service agents access to text blocks 192 that are classified as actionable.

In one example, the response engine 121 assigns a name, identifier, hash value, or any representation of a text block 192 that is classified as actionable. For each line item in the queue 151, the response engine 121 may include this representation of a text block 192.

Additionally, for each line item in the queue 151, a link to the text block 192 to facilitate retrieval from the original source of the text block 192 may be included. As text blocks 192 are retrieved from various network sites, a link to the network site that originated the text block 192 may be useful to customer service agents for obtaining a context from which the text block 192 was authored. Also, a user identifier that is associated with the text block 192 may be included for each line item of the queue 151. This information ties the text block 192 to a customer who originally expressed a concern. Thus, the actionable items in a queue 151 may be serialized and presented as a contact list that is provided to a customer service agent. In this case, the contact list includes contact information or any other user identifier information for the customer who posted the content of an actionable text block.

In addition to managing the queue 151 of actionable text blocks 192, the response engine may further 121 grant customer service agents access to the queue 151 for allowing the customer service agents to respond to the customer who authored an actionable text block 192. Alternatively, the response engine 121 interfaces with a CRM system 128 to provide customer service agents access to the queue, where the CRM system 128 manages the queue 151. For example, one line item of the queue 151 may provide the raw text of an actionable text block 192, a link to a network page within the network site that includes the actionable text block 192, a user identifier that is associated with the actionable text block 192, or any other information. The customer service agent can use line items in the queue 151 to generate a response to customers who post customer concerns on network sites. For example, a customer service agent may send an electronic message, such as an email, to such customers. Specifically, the text block retriever 115 may be configured to identify and retrieve user identifiers such as email addresses, phone numbers, or any other contact information that is associated with a particular text block 192. Additionally, customer service agents may use a client 106 to post responses on the network site in response to a customer concern.

Figure 2A:
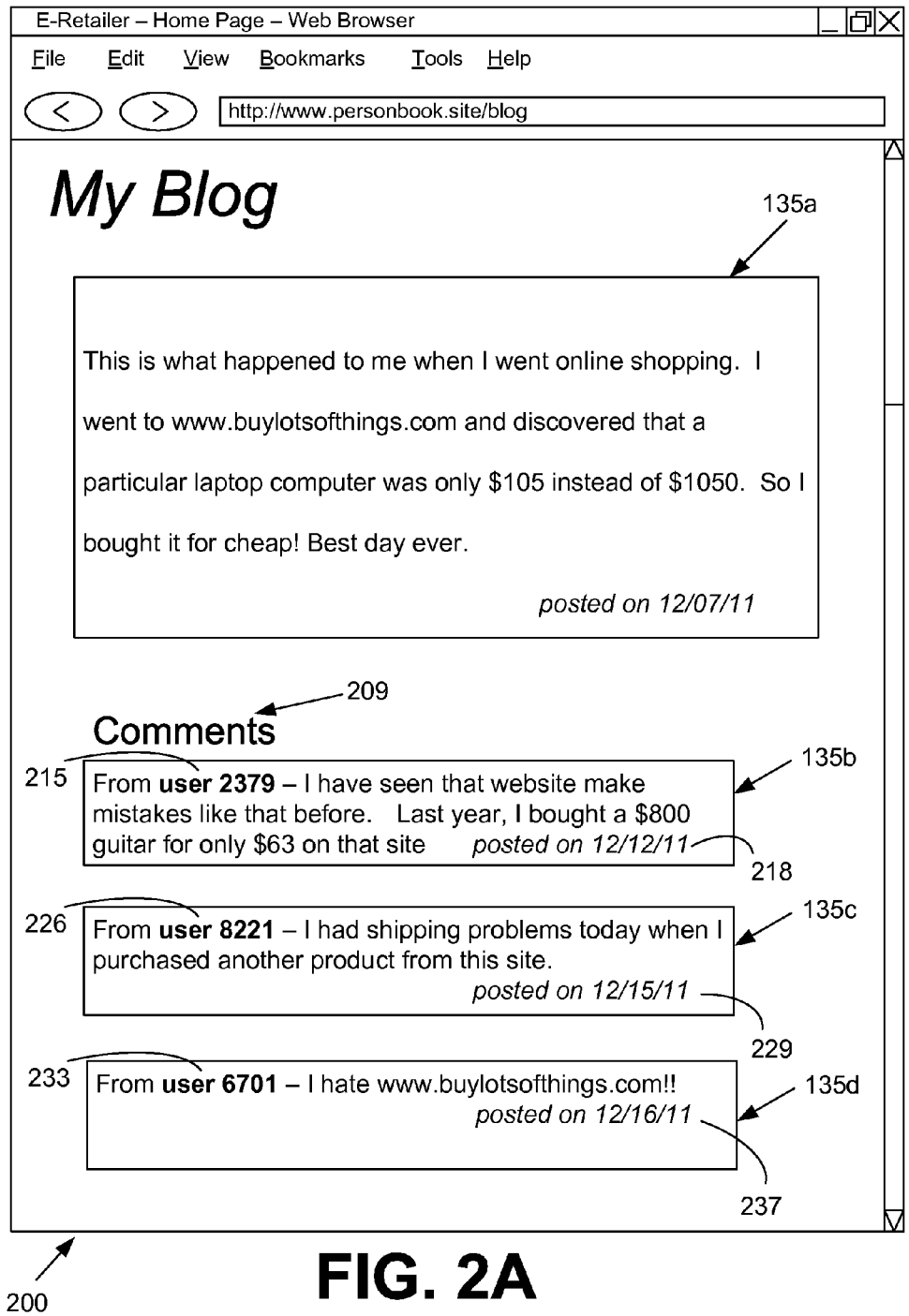
FIG. 2A is a drawing of an example of a network site managed by a network site computing device in the networked environment of FIG. 1 according to various embodiments of the present disclosure.

Referring next to FIG. 2A, shown is an example of a network site managed by a network site computing device 107 (FIG. 1) in the networked environment 100 of FIG. 1. Specifically, FIG. 2A is an example of a network page 200 managed by a network site. A network site computing device 107 is configured to host a network site for facilitating the online posting of user generated data.

Customers may access a network site and post user generated content which is presented within a network page 200. In the example of FIG. 2A, the network site is a blog site that allows a customer to post a blog entry 135a. The blog entry 135a is user generated content 135 (FIG. 1) that may or may not express an actionable customer concern. In the exemplary network page 200, a comments section 209 is included for allowing customers to respond to the blog entry 135a. Furthermore, in this example, comments 135b-135d are generated by customers. Each of the comments may include a corresponding user identifier 215, 226, 233 as well as a corresponding date of post 218, 229, 237.

A content handler 125 (FIG. 1) may be used for extracting information from various network sites to identify any customer concern that may be deemed actionable. In this case, the content handler 125 accesses the network page 200 of a network site that facilitates the presentation of user generated content 135. The content handler 125 identifies and retrieves text blocks 192 (FIG. 1) and classifies each text block 192 to determine if each text block 192 is actionable. The content handler 125 further updates a queue 151 (FIG. 1) for allowing customer service agents to respond to any customer concerns expressed in the user generated content of the network page 200.

First, the content handler 125 employs a text block retriever 115 (FIG. 1) to retrieve text blocks 192 contained within the network page 200. In this example, the text block retriever 115 determines that the blog entry 135a is a text block 192. Additionally, the text block retriever 115 determines that the comments 135b-135d are each text blocks 192. Thus, in this example, the text block retriever 115 identifies four distinct text blocks 192. For identifying text blocks 192, a text block retriever 115 may analyze the source code of a network page to determine a formatting of each text block 192. Alternatively, the text block retriever 115 may use a set of API functions to identify text blocks 192 contained within the network page 200.

After the text block retriever 115 determines that the blog entry 135a and comments 135b-135d are four text blocks, the text block retriever 115 retrieves the text blocks 192 by storing the text in a text block storage 154 (FIG. 1). The storage of these text blocks 192 may be in a raw form or some processed form. In one embodiment, the text block retriever 115 identifies an email address associated with the author of the blog entry 135a and retrieves the email address. In this case, an email address may exist as text presented in the network page 200. Furthermore, this email address is associated with the text block that corresponds to the blog entry 135a. This allows customer service agents to easily obtain the contact information of the author of the blog entry 135a, if needed.

Next, the content handler 125 employs a text classifier 118 (FIG. 1) to classify each of the four retrieved text blocks 192. With regard to the text block 192 that corresponds to the blog entry 135a, the text classifier 118 may determine that the content within the blog entry 135a expresses a customer concern. To make this determination, the text classifier 118 uses the text within the text block 192 as well as any training data 161 (FIG. 1) that has been used to configure the text classifier 118. In this example, a text classifier 118 has been trained by customer service agents to deem actionable any content that expresses a recent customer issue that can be easily addressed.

In this example, the blog entry 135a indicates that a customer has uncovered a mistake made by the online retailer www.buylotsofthings.com. Specifically, the online retailer is selling a product for $105 rather than $1050. It is in the interest of the online retailer to take remedial action to prevent subsequent customers from exploiting this mistake. Generally, a customer service agent may deem this as content that expresses an actionable customer concern. Thus, a trained text classifier 118 may generate a score that exceeds a predefined threshold and determine that the content of the blog entry expresses an actionable customer concern. This is because the customer concern expressed in the blog entry 135a is a recent customer issue that can be easily addressed.

The first comment 135b may also be analyzed by the text classifier 118 for determining whether the first comment expresses an actionable customer concern. Here, the first comment 135b indicates that a customer has uncovered a mistake made by the online retailer. However, this mistake was made a year ago. While this comment 135b expresses a somewhat relevant customer concern, a customer service agent might generally not deem this as actionable. Accordingly, text classifier 118 trained by a customer service agent may assign a score that is less than the score associated with the blog entry 135a. Furthermore, this score may fall below a threshold value such that the text classifier 118 classifies the first comment 135b as unactionable. Particularly, this customer issue expressed in the first comment is not recent such that a customer service agent would deem this as actionable.

The second comment 135c indicates that a customer has a recent issue with the online retailer in the form of a product shipping concern. A text classifier 118 trained by a customer service agent may assign a high score that exceeds a threshold value for classifying this user generated content as an actionable item.

The third comment 135d indicates that a customer is generally upset with the online retailer. Based on the training that a text classifier 118 has received, this comment 135d may not be classified as an actionable customer concern because this issue cannot be easily addressed.

If the text classifier 118 has classified the blog entry 135a and the second comment 135c as actionable, then the content handler 125 may employ a response engine 121 (FIG. 1) to update a queue 151 for itemizing each actionable text block 192 for review by a customer service agent. When placing the second item in the queue 151, for example, a user identifier 226, a date of post 229, and a link to the network page 200 may be included in the queue 151. This may assist a customer service agent in identifying the customer who posted the second comment 135c and addressing his or her issue. The queue 151 may managed by the CRM system 128 for providing customer service agents access to the outputs of the text classifier 118.

Figure 2B:
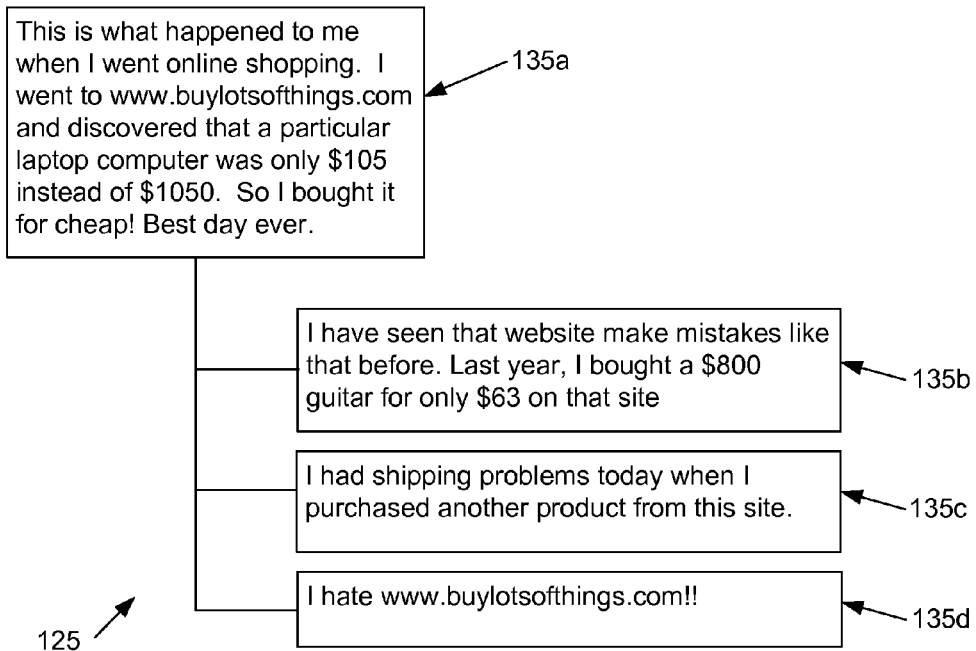
FIG. 2B is a drawing of an example of an operation of a content handler executed in a computing device in the networked environment of FIG. 1 according to various embodiments of the present disclosure.

Turning now to FIG. 2B, shown is a drawing of an example of an operation of a content handler 125 executed in a computing device 103 in the networked environment 100 of FIG. 1. The content handler 125 may be configured to store text block structure 159 (FIG. 1) with regard to retrieved text blocks 192 (FIG. 1). The text block structure 159 may be stored with respect to a network page. Alternatively, text blocks 192 of at least a portion of the network site may be retrieved and stored along with an associated text block structure 159.

Using the example in FIG. 2A, a content handler 125 retrieves a blog entry 135a and comments 135b-135d as text block inputs for a text classifier 118 (FIG. 1). The content handler 125 may be configured to store a text block structure 159 with each of the four text blocks 192 retrieved from the network page 200 (FIG. 2A). For example, FIG. 2B depicts a text block structure 159 of a tree structure. Here, the blog entry 135a is on the upper tier while comments 135b-135d, made in response to the blog entry 135a, are depicted as lower tiers or branches of the blog entry 135a. A tree structure may characterize the text block structure 159 of a single network page or it may characterize the plurality of text blocks 192 within an entire network site.

In one embodiment, the content handler 125 stores retrieved text blocks 192 as a tree structure regardless of the classification of the text block 192. In this embodiment, the stored text block structure 159 associated with each text block 192 allows the content handler 125 to determine whether a network site includes text blocks 192 that have not been retrieved. For example, if there is a change in the text block structure 159 resulting from a subsequent visit of a network site, then the content handler 125 expects that unretrieved text blocks may be present.

Accordingly, the content handler 125 matches the tree structure generated from a prior visit of a network site to the tree structure of a current access of the same network site. Branches of the tree structure that have not changed are marked with a marker. This marker is stored along with the text block structure 159 of a particular network page or network site.

In various embodiments, the text classifier 118 is configured to access a text block structure 159 in order to generate a classification result. Text block structure 159 may indicate that a particular text block 192 is part of a thread of text blocks arranged in a chronological or tree structure. The text classifier 118 may refer to the structure of a particular text block to obtain a context. For example, when handling the second comment 135c, the text classifier 118 may access the text block structure 159 associated with the second comment 135c. Specifically, the text block structure 159 associated with the second comment 135c indicates that the second comment 135c originated from the blog entry 135a. Accordingly, the text classifier 118 can use a combination of the blog entry 135a and the second comment 135c to classify the second comment 135c.

For example, the second comment 135c states "I had shipping problems today when I purchased another product from this site." The text of the second comment 135c alone is unclear as to what is "this site." However, when read in the context of the blog entry 135a, a text classifier 118 can associate the second comment 135c to the site www.buylotsofthings.com. Thus, when the text block structure 159 indicates a threading of multiple text blocks, the text classifier 118 can account for context when generating a classification of a text block 192.

In an alternative embodiment, one or more text classifiers 118 are configured to ignore or otherwise under prioritize the classification of text blocks 192. For example, the blog entry 135a expresses a customer concern relating to a mistake made by an online merchant such that the mistake may be exploited by customers. If this mistake is remedied, then subsequent comments made in response to the customer issue expressed in the main blog entry 135a may be ignored or under prioritized. Thus, in one embodiment, a customer service agent may indicate a resolute to a particular customer issue expressed in one or more text blocks. This fact may be stored as metadata corresponding to any implicated text blocks. Metadata, for example, may be any text block structure 159 or text block status 149 associated with a text block 192. Thus, the text classifier 118 may consult this metadata when generating a classification result. If the text classifier 118 is configured to ignore text blocks 192 that have been flagged as resolved, then the classification process is skipped. Alternatively, if the text classifier 118 is configured to under prioritize resolved text blocks 192, then the text classifier 118 may apply a weight to the score that effectively increases the threshold for achieving an "actionable" classification.

Figure 3:
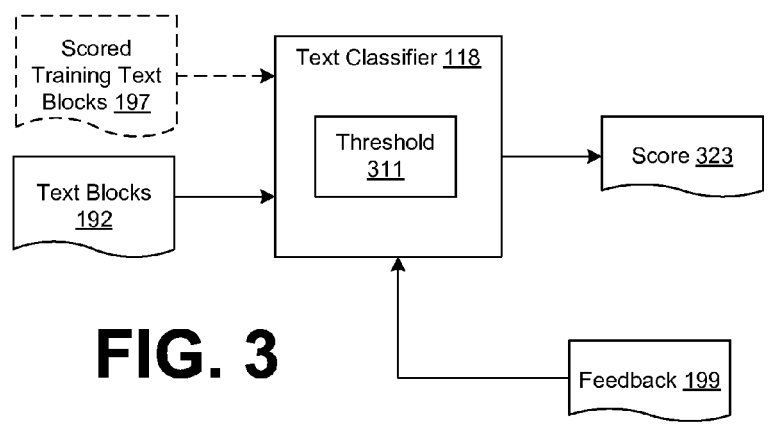
FIG. 3 is a drawing of an example of an operation of a text classifier executed in a computing device in the networked environment of FIG. 1 according to various embodiments of the present disclosure.

Moving on to FIG. 3, shown is an example of an operation of a text classifier 118 executed in a computing device 103 (FIG. 1) in the networked environment 100 of FIG. 1. Specifically, FIG. 3 represents one embodiment of a text classifier 118 that can be trained by a customer service agent.

A content handler 125 (FIG. 1) employs a text classifier 118 to classify an inputted text block 192. The text classifier 118 performs a series of calculations to generate and assign a score 323 to an inputted text block 192. In one embodiment, the score 323 is a value within a range of values such as, for example, a rational number between 0 and 1. Furthermore, a binary result may be derived from the score such that scores that are greater than or equal to a threshold 311 are one binary result while scores below the threshold 311 are the other binary result. In addition to receiving an input of a text block 192, the text classifier 118 may also receive feedback 199 or scored training text blocks 197 for purposes of training the text classifier 118.

In one embodiment, feedback 199 may be used by customer service agents for feeding back any text blocks 192 that they have were wrongly classified. Feedback 199 reduces the risk that a text classifier 118 will repeat a similar misclassification on a subsequent attempt. Customer service agents may look through a list of classified text blocks 192 to either confirm or correct the classification. By correcting or confirming a classification, the text classifier builds a knowledge base and encodes it as training data 161 (FIG. 1) for subsequent use in the field.

In one embodiment, the generation of feedback 199 may be facilitated by a CRM system 128 (FIG. 1). In this case, customer service agents may submit feedback 199 through a user interface provided by the CRM system 128. The CRM system 128 sends the feedback 199 to the text classifier 118 for training. Additionally feedback 199 may be sent to the text classifier 118 to provide continuous training while the text classifier 118 is deployed and online.

In another embodiment, a scored training text block 197 may be transmitted to the text classifier 118 by an administrator such as a customer service agent using a client 106 (FIG. 1). In one embodiment, the scored training text block 197 comprises a sample text block and a corresponding expected score. For example, a customer service agent may input sample text blocks that the customer service agent deems actionable. Thus, this input comprises a sample text block along with an expected score that corresponds to an "actionable" binary result. In the example above, this score equals to the value of 1. Thus, each scored training text block 197 may include text similar to that of the blog entry 135*a* and the second comment 135*c* of FIG. 2A. Additionally, the scored training text blocks 197 may include content that expresses an unactionable customer concern. To this end, the text classifier 118 can build a knowledge base of what content is actionable and what content is unactionable based on examples provided by the scored training text blocks 197. This knowledge base is encoded as training data 161. Therefore, when the text classifier 118 processes text blocks 192 in field use, the text classifier 118 leverages the received training. Thus, scored training text blocks 197 are used for training a text classifier 118 while the text classifier is offline prior to deployment.

Ultimately, the functionality of the text classifier 118 is dependent on the feedback 199 or scored training text blocks 197 for training the text classifier 118. For example, a customer service agent who desires that actionable issues constitute offensive and/or obscene language can train a text classifier 118 accordingly. In this example, a customer service agent employing the content handler 125 may wish to configure the content handler 125 to identify any offensive and/or obscene content from a network site. A text classifier 118 can receive scored training text blocks 197 expressing offensive and/or obscene content to build training data 161 accordingly.

In one embodiment, a plurality of text classifiers 118 are employed where each text classifier 118 has been trained with a different definition of what constitutes "actionable" and "unactionable." Thus, each text classifier 118 will have its own corresponding training data 161. In other embodiments, each text classifier 118 may utilize similar corresponding training data that is compiled by one or more of the text classifiers.

In one embodiment, where a set of text classifiers 118 are employed, each text classifier 118, among the set of text classifiers 118, is dedicated to a particular customer issue. In one example, each customer issue is associated with an issue code that is recognized by the CRM system 128 (FIG. 1). In this case each text classifier 118 is trained according to a particular customer issue. Moreover, the set of text classifiers 118 may be configured to execute the classification process in parallel such that a particular text block 192 is inputted into each of the text classifiers 118 in parallel. For each text classifier 118, a corresponding score is generated for the inputted text block 192.

In another embodiment, each text classifier 118 is routed to a corresponding queue 151. To this end, each text classifier 118 and queue 151 pair is dedicated to a customer issue associated with a corresponding issue code. The CRM system 128 may facilitate access to each queue 151, where a group of customer service agents are responsible for customers issues of a like issue code.

In yet another embodiment, multiple text classifiers 118 are employed where each text classifier 118 has been trained to classify a text block 192 according to a unique, respective customer issue. The output of each of the text classifiers are routed to one or more customer service agents who are responsible for a particular customer issue. For example, if one of the text classifiers 118 has been trained to determine whether a text block 192 expresses an actionable customer issue that is a product shipping issue, then the output of this text classifier may be routed to customer service agents who are responsible for product shipping issues.

In another embodiment, the threshold 311 is configurable. In this case, if it is noted that a particular text classifier 118 is too liberal in classifying a text block 192 as actionable, then the threshold can be modified to heighten the standard for classifying a text block 192 as actionable. That is to say, a higher score will be needed to populate the queue 151 (FIG. 1) of actionable text blocks 192. Additionally, if the text classifier 118 is producing inaccurate results, more training by a customer service agent may be needed.

Figure 4:
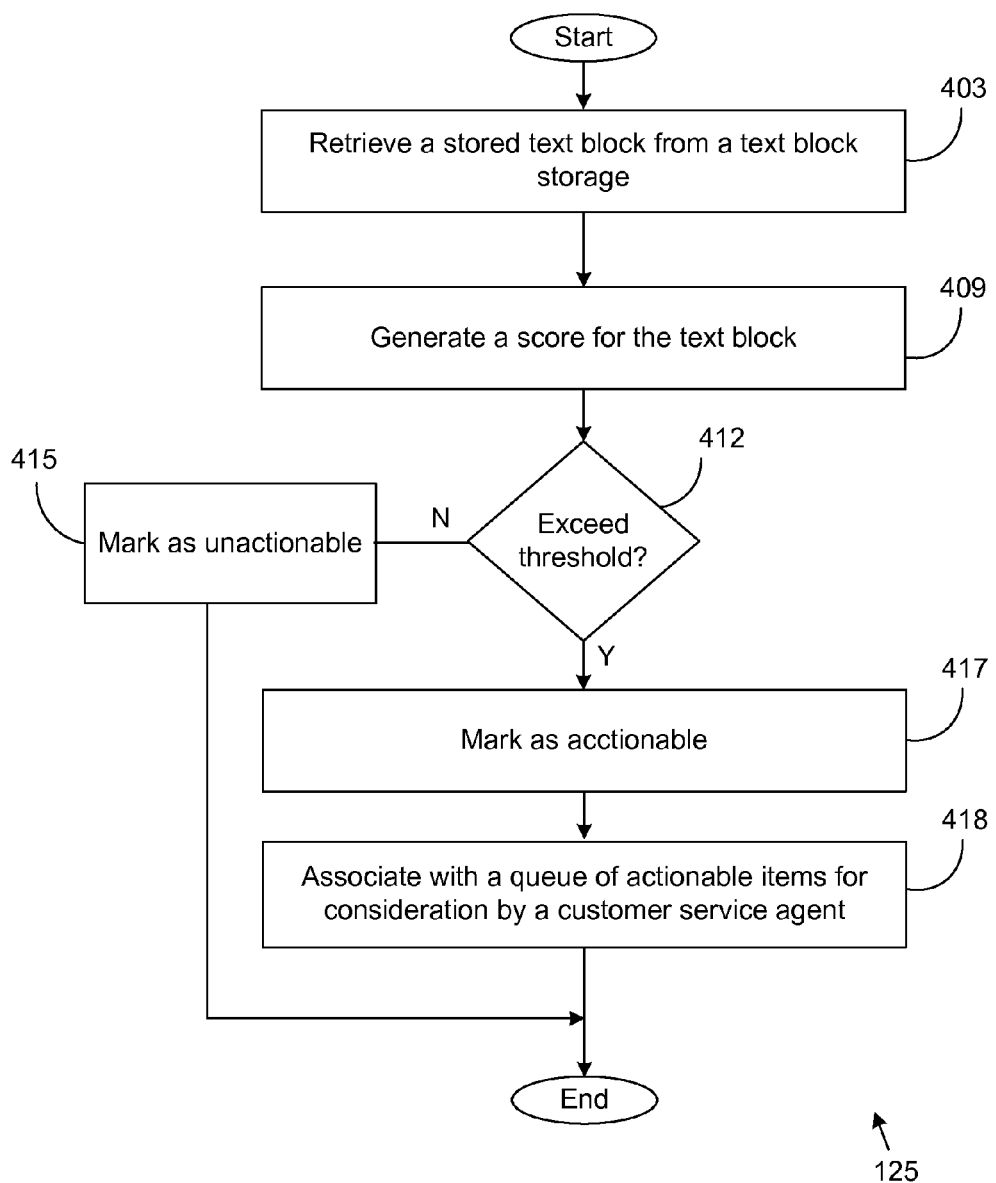
FIG. 4 is a flowchart illustrating one example of functionality implemented as portions of a content handler executed in a computing device in the networked environment of FIG. 1 according to various embodiments of the present disclosure.

Referring next to FIG. 4, shown is a flowchart that provides one example of the operation of a portion of the content handler 125 according to various embodiments. It is understood that the flowchart of FIG. 4 provides merely an example of the many different types of functional arrangements that may be employed to implement the operation of the portion of the content handler 125 as described herein. As an alternative, the flowchart of FIG. 4 may be viewed as depicting an example of steps of a method implemented in the computing device 103 (FIG. 1) according to one or more embodiments.

Text blocks 192 (FIG. 1) within various network sites are identified, retrieved and stored in a data store 112 (FIG. 1). Specifically, the content handler 125 employs a text block retriever 115 (FIG. 1) for text block retrieval. The content handler 125 may also track the status of the text block 192. For example, the content handler 125 may store a time of retrieval and/or a user identifier associated with a retrieved text block 192. The content handler 125 may store this as text block status 149 (FIG. 1) for assisting the content handler 125 in determining whether to or when to access the text block 192 again for a subsequent retrieval. For example, the content handler 125 may be configured to periodically retrieve a particular text block 192 to ensure that the particular text block 192 is up-to-date as user generated content may be updated and/or revised with new content. Thus, a text block 192 that was recently retrieved may not need to be retrieved again until a later point in time. Tracking a retrieved text block 192 may also comprise storing a text block structure 159 (FIG. 1) for determining whether a text block 192, on a subsequent visit to the network site by the content handler 125, has been retrieved in the past.

Beginning with box 403, the content handler 125 retrieves a stored text block from the text block 192 in storage. Next, in block 409, the content handler 125 generates a score for the text block 192. The content handler 125 may employ an algorithm for processing function, such as, for example, a text classifier 118 (FIG. 1) to generate and assign a score to the text block 192. In box 412, the content handler 125 determines whether the score exceeds a threshold. The score is used for assigning a binary result to the text block 192. Whether the score falls above or below the threshold determines the binary result. Furthermore, the binary result signifies whether content expressed in the text block 192 is an actionable customer concern. Scores that fall below the threshold are assigned a binary result that signifies that the content of the text block 192 does not express an actionable customer concern. In box 415, when the assigned score of a text block 192 falls below a threshold value, the text block is marked as unactionable.

However, as seen in box 417, if the score is greater than or equal to the threshold, the text block 192 is marked as actionable. Then, in box 418, the content handler associates the actionable text block 192 with a queue of actionable items for consideration by a customer service agent. In one embodiment, the content handler 125 maintains a queue 151 (FIG. 1) with a representation of the text block 192. That is to say, the text block 192 is placed in a queue 151 as a line item where the line item includes a representation that represents the particular text block 192. Furthermore, the content handler 125 grants access to the queue 151 for facilitating generating a response message to the customer associated with the text block. A content handler 125 employs a response engine 121 (FIG. 1) for managing the queue 151 to allow customer service agents to address customer concerns that have been classified as actionable. In an alternative embodiment, the queue 151 is a list of text blocks 192 that may be filtered to present only actionable text block items. The list may be filtered based on whether a text block 192 is marked as actionable or unactionable. In other embodiments, the queue of actionable items is managed by a CRM system 128 (FIG. 1) that grants customer service agents access to the outputs of the text classifier 118.

Figure 5:
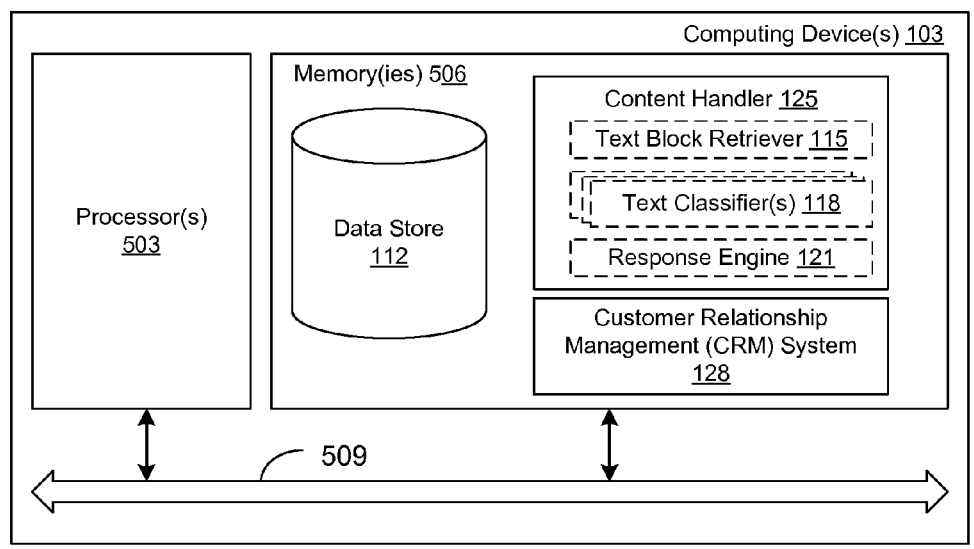
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the content handler 125, the customer relationship management (CRM) system 128 and potentially other applications. The content handler 125 may include a text block retriever 115, a text classifier 118, and a response engine 121. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the content handler 125, the CRM system 128, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the content handler 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content handler 125 and CRM system 128, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one computing device, causes the at least one computing device to at least:
   retrieve a first text block from a network site, wherein the first text block corresponds to a user, and the network site includes user generated content;
   track a retrieval status for the first text block, wherein the retrieval status comprises a time of retrieval;
   employ a text classifier for generating a score for the first text block, wherein the text classifier is configured to be trained by feedback for determining that a content of the first text block expresses an actionable user concern capable of being addressed by a customer service agent;
   determine that the content of the first text block expresses the actionable user concern based at least in part on the score satisfying a threshold value;
   in response to determining that the content of the first text block expresses the actionable user concern, associate the first text block with a queue; and
   determine that a second text block has been retrieved from the network site.

2. The non-transitory computer-readable medium of claim 1, wherein the program further causes the at least one computing device to at least employ a set of application programming interface functions.

3. The non-transitory computer-readable medium of claim 1, wherein the program further causes the at least one computing device to at least determine a text block structure associated with the first text block.

4. The non-transitory computer-readable medium of claim 1, wherein the program further causes the at least one computing device to cause the at least one computing device to at least retrieve a user identifier associated with the user.

5. A system comprising:

a data store; and at least one computing device in communication with the data store, the at least one computing device configured to at least:

retrieve a plurality of text blocks from a network site, wherein each text block of the plurality of text blocks corresponds to a respective user of a plurality of users;

employ a text classifier for generating a binary result for each text block of the plurality of text blocks, wherein the text classifier is configured to be trained by feedback and the binary result indicates whether a content of the text block expresses an actionable user concern capable of being addressed by a customer service agent; and associate, with a queue, a representation of each text block of the plurality of text blocks having content that expresses the actionable user concern as indicated by the binary result for the text block.

6. The system of claim 5, wherein the at least one computing device is further configured to at least structure the plurality of text blocks for maintaining a relationship among the plurality of text blocks.

7. The system of claim 5, wherein the at least one computing device is further configured to at least track a retrieval status for each text block of the plurality of text blocks, wherein the retrieval status comprises a time of retrieval.

8. The system of claim 5, wherein the at least one computing device is further configured to at least determine that a text block of the plurality of text blocks has not been retrieved from the network site.

9. The system of claim 5, wherein the network site comprises at least one of a social networking site, a micro-blogging site, a blog, or a user review site.

10. The system of claim 5, wherein the at least one computing device is further configured to employ a set of application programming interface functions.

11. The system of claim 5, wherein the at least one computing device is further configured to crawl the network site.

12. The system of claim 5, wherein the binary result is derived from a score generated by the text classifier and the score is a value in a predefined range of values.

13. The system of claim 5, wherein the queue further includes a respective user identifier of a plurality of user identifiers corresponding to each representation.

14. The system of claim 13, wherein the at least one computing device is further configured to at least grant access to the queue for facilitating generating a response message to at least one user based at least in part on the respective user identifier of the plurality of user identifiers.

15. A computer-implemented method comprising:

retrieving, in at least one computing device, a text block from a network site;

processing, in the at least one computing device, the text block to generate a plurality of scores, wherein each score of the plurality of scores is in a predefined range of values;

determining, by the at least one computing device, that a content of the text block expresses an actionable user concern based at least in part on at least one score of the plurality of scores satisfying a threshold value, wherein the actionable user concern is capable of being addressed by a customer service agent;

in response to determining that the content of the text block expresses the actionable user concern, storing, in a memory accessible to the at least one computing device, a representation of the text block in at least one queue of a plurality of queues; and granting access, in the at least one computing device, to the at least one queue of the plurality of queues to generate a message in response to the text block.

16. The computer-implemented method of claim 15, wherein each score of the plurality of scores is generated by a corresponding text classifier.

17. The computer-implemented method of claim 16, wherein the corresponding text classifier is configured to be trained by inputting a plurality of scored training text blocks for characterizing whether the content expresses the actionable user concern, wherein the corresponding text classifier is associated with a corresponding knowledge base of training data.

18. The computer-implemented method of claim 17, wherein the corresponding text classifier is trained according to a corresponding customer issue.

19. The computer-implemented method of claim 18, wherein the corresponding customer issue is associated with a corresponding issue code, wherein the corresponding issue code is recognized by a customer service management system, and wherein the customer service management system is configured to manage the plurality of queues.

20. The computer-implemented method of claim 17, wherein each scored training block of the plurality of scored training text blocks comprises a predetermined score.

21. The computer-implemented method of claim 15, further comprising determining whether the network site contains an additional text block that has not been retrieved.

22. The computer-implemented method of claim 15, wherein retrieving the text block further comprises of storing text block structure data associated with the text block.

* * * * *